United States Patent [19]

Clay et al.

[11] E Patent Number: Re. 32,735

[45] Reissued Date of Patent: Aug. 23, 1988

[54] LINE SCAN READER/WRITER BY HOLOGRAPHIC COLLECTION

[75] Inventors: Burton R. Clay, Wayland; William O. Thrailkill, Boston, both of Mass.

[73] Assignee: Holographix Inc., Burlington, Mass.

[21] Appl. No.: 886,518

[22] Filed: Jul. 15, 1986

Related U.S. Patent Documents

Reissue of:

[64] Patent No.: 4,488,042
Issued: Dec. 11, 1984
Appl. No.: 368,494
Filed: Apr. 15, 1982

[51] Int. Cl.[4] ..... H01J 5/16

[52] U.S. Cl. ..... 250/235; 250/566; 350/3.72

[58] Field of Search ..... 350/3.7, 3.71, 3.72, 350/3.73; 250/234, 235, 236, 578, 550, 566, 568; 356/445, 446; 358/293, 294; 365/125

[56] References Cited

U.S. PATENT DOCUMENTS

| | | | |
|---|---|---|---|
| 4,199,219 | 4/1980 | Suzuki et al. | 356/445 |
| 4,253,723 | 3/1981 | Kojima et al. | 350/3.71 |
| 4,312,559 | 1/1982 | Kojima et al. | 350/3.72 |
| 4,333,006 | 6/1982 | Gorin et al. | 350/3.71 |
| 4,429,220 | 1/1984 | Noguchi | 250/236 |
| 4,458,979 | 7/1984 | Ross | 350/3.71 |

OTHER PUBLICATIONS

IBM Technical Disclosure, "Formation of Optical Elements by Holography", G. T. Sincerbox, Aug. 1967, pp. 267–268.

*Primary Examiner*—David C. Nelms
*Attorney, Agent, or Firm*—Lahive & Cockfield

[57] ABSTRACT

An electro-optical scanner which can write and read with common optics by using a phase hologram near the focal plane of the scanned surface.

36 Claims, 6 Drawing Sheets

LINE SCAN READER/WRITER BY HOLOGRAPHIC COLLECTION

Matter enclosed in heavy brackets [ ] appears in the original patent but forms no part of this reissue specification; matter printed in italics indicates the additions made by reissue.

BACKGROUND OF THE INVENTION

The present invention relates to electro-optical scanning devices, particularly those devices used for reading any two dimensional printed surface for the purpose of making a duplicate or digital record of the information contained on the surface.

In one type of electro-optical reader, the subject surface is illuminated by scanning with a focused laser beam and the light reflected off the surface is collected to obtain a representation of that surface.

In optical scanning systems it would be economically and practically desirable to use a single optical system to illuminate and read the document. However, in the past, certain system incompatibilities have prevented this type of design. Because the majority of surfaces of documents to be examined are opaque, such an optical reader must be designed to extract its information from light reflected off the opaque surface.

Light reflected off any surface may be characterized as having two components: both a specular and a diffuse component. In the case of a paper document, if the paper and ink have similar specular reflectances, the specular reflection off the surface will be devoid of information, while the diffuse component will carry all the meaningful information to be extracted. Where the axis of incident illumination is normal to the paper surface, the specular reflection will also be centered about that axis. Therefore, to increase the collection of the information-bearing or diffuse component, the optical axis of the reader detector is placed at an angle from twenty (20) degrees to fifty (50) degrees from the paper normal. Since the specular reflection, like glare, is generally much brighter than the diffuse component, the diffuse component must be collected from the entire annulus surrounding the specular component to improve the signal-to-noise ratio.

In the past, optical scanning readers have collected the diffuse component from a portion of the desired collection annulus by placing two or more linear arrays of optical fibers parallel to the scan line at an angle of forty-five (45) degrees from the paper surface, such that each array cuts through the desired collection annulus. These fibers were bundled to terminate in a single detector so that each illuminated position on the document surface could be related to a time varying detector signal. Systems which employ this type of fiber optic assembly are generally very expensive, because of the cost of the fiber optic assembly itself, and because they require a large area detector, for example, a photomultiplier, to measure the collected light. A further disadvantage of these systems is that their efficiency is limited by the number of fiber arrays which can physically be placed in the annulus, and by the size of the photomultiplier or detection surface which terminates the fiber bundle.

It is accordingly a primary object of the present invention to provide an improved apparatus for the reading and/or writing of a surface.

SUMMARY OF THE INVENTION

The above and other objects of the present invention are achieved by placing a phase hologram close to an illuminated subject surface to collect and focus a substantial portion of the signal bearing diffuse component into an optical detector or reader assembly. This hologram simultaneously collects the diffuse component from all meridians within the desired collection annulus while discriminating against the specular informationless component. The same optical assembly used to focus and illuminate such surface may be used to relay the diffuse component collected by the hologram to the optical detector for reading or to a writer assembly for writing, thus reducing system complexity and cost.

BRIEF DESCRIPTION OF THE DRAWINGS

The above and other objects of the present invention are achieved in the illustrative embodiment as described with respect to the Figures in which.

DESCRIPTION OF THE PREFERRED EMBODIMENT

Figure 1A:
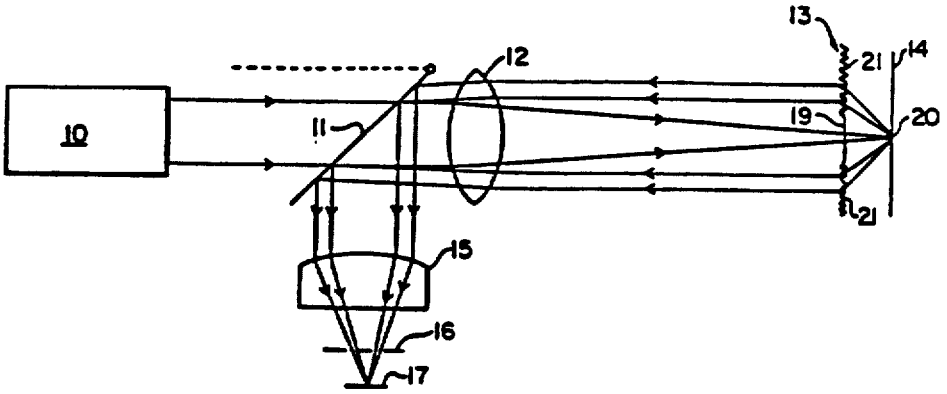
FIGS. 1A and 1B show schematic side views of the subject invention used as an optical reader and writer, respectively.
Figure 1B:
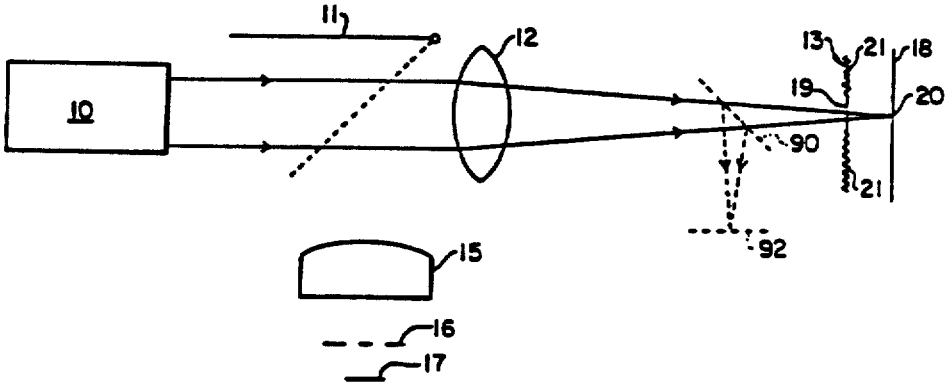

Referring to FIGS. 1A and 1B, the device of the present invention includes a source of illumination 10, a pivoting optical beam splitter 11, a primary focussing lens or assembly 12, a phase hologram ("hologram") 13, a subject surface to be examined 14, a detector focussing lens or assembly 15, associated detector aperture stops 16, and an optical detector 17.

As shown in FIG. 1A, light from source 10, for example, a helium neon (HeNe) laser, passes through beam splitter 11 to focussing assembly 12. Assembly 12 focuses the source through the unmodulated portion 19 of hologram 13 to a point 20 on surface 14 of an opaque document which is to be scanned and read. Typically, focusing point 20 might have a diameter of 100 microns. In practice, document surface 14 could be systematically moved by some external mechanism in two directions, for example, in a raster scan pattern, such that every portion of document 14 would appear beneath spot 20 to effect the read process.

The diffuse component of the light reflected off surface 14 at spot 20 is collected by the modulated portion 21 of hologram 13 and focused through primary focusing lens 12 to beam splitter 11. This reflected light is relayed by beam splitter 11 to optical detector focussing assembly 15, and past optical stops 16 to detector 17.

FIG. 1B shows the same system with the beam splitter 11 removed from the optical path. In this configuration, the same optical system may be used as a noncontact or nonimpact (i.e., writer) printer. Light from source 10 is focused by optical assembly 12 through the unmodulated portion 19 of hologram 13 to point 20 on the recording surface 18. Thus, the same optical assembly can be used as a reader as shown in FIG. 1A, or a writer, as shown in FIG. 1B. However, it is understood that such beam splitter 11 need not be removed from such optical path, however, for maximum writing efficiency, it should be. It should also be understood that the surface to be written on need not be located such that the optical path to such surface is through the unmodulated portion 19 of hologram 13. Rather, as shown by dotted lines, the optical path to a surface 92 to be written on may be coupled by use of a folding mirror 90 which is pivoted out of the position shown when reading the surface 14 as shown in FIG. 1A. For such writing purposes, surface 92 may comprise a photosensitive material.

Figure 5:
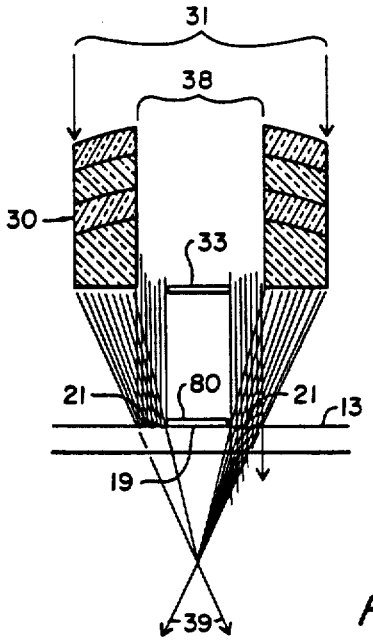
FIG. 5 shows in cross section one method of fabricating a phase hologram according to the present invention.
Figure 6A:
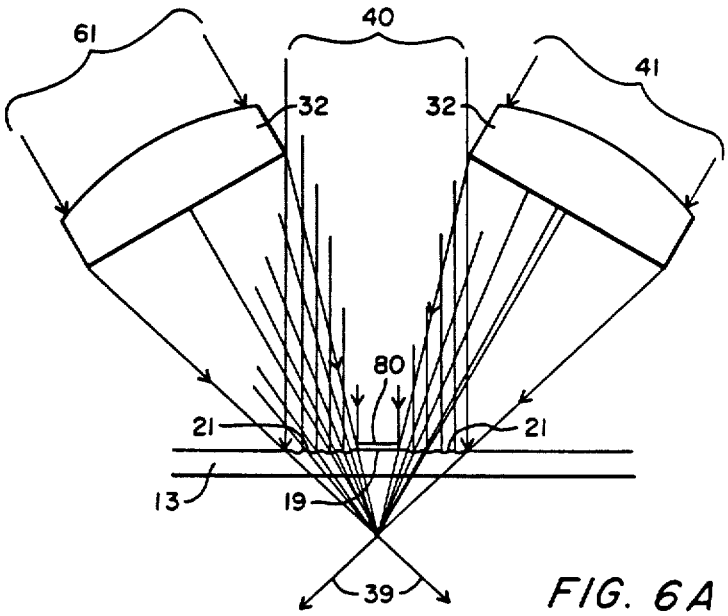
FIGS. 6A and 6B show in cross section a second method of fabricating a phase hologram according to the present invention.

The optical reader hologram 13 may be produced in several ways. FIG. 5 shows a method of producing the interference fringes necessary to record the desired hologram. A lens 30 with hole 38 bored through the center allows passage of the reference beam 31 through the center, while the outer portion of the beam is focused by lens 30 to a point below the hologram 13. The region of interference between the two resulting wavefronts produces an annular area on the surface of the holographic recording medium, which may comprise a photoresist material. Stop 33 prevents exposure of the central portion of the holographic surface, which will be used only for transmission of the source illumination of spot 20 on the document 14. A phase hologram results. A series of overlapping holograms are required to create a hologram capable of reading over the entire scan line width. This is accomplished by translating the hologram along the desired scan line between exposures. The hologram recording axis is rotated in the plane of the scan beam as a function of scan position, such that the readout beam axis will be colinear with the scan beam during illumination and readout. For the system of FIGS. 2 and 3, a rectangular stop 80, as shown in FIGS. 5 and 6A, placed on or near the surface of hologram 13 prevents exposure of unmodulated portion 19 of hologram 13 thereby producing the configuration of hologram 13 as shown in FIG. 3. The light collected by a hologram recorded by this method is limited by the maximum numerical aperture (N.A.) of the recording lens 30, which is approximately 0.6. This corresponds to a maximum collection angle 39 of approximately forty-five (45) degrees.

Figure 6B:
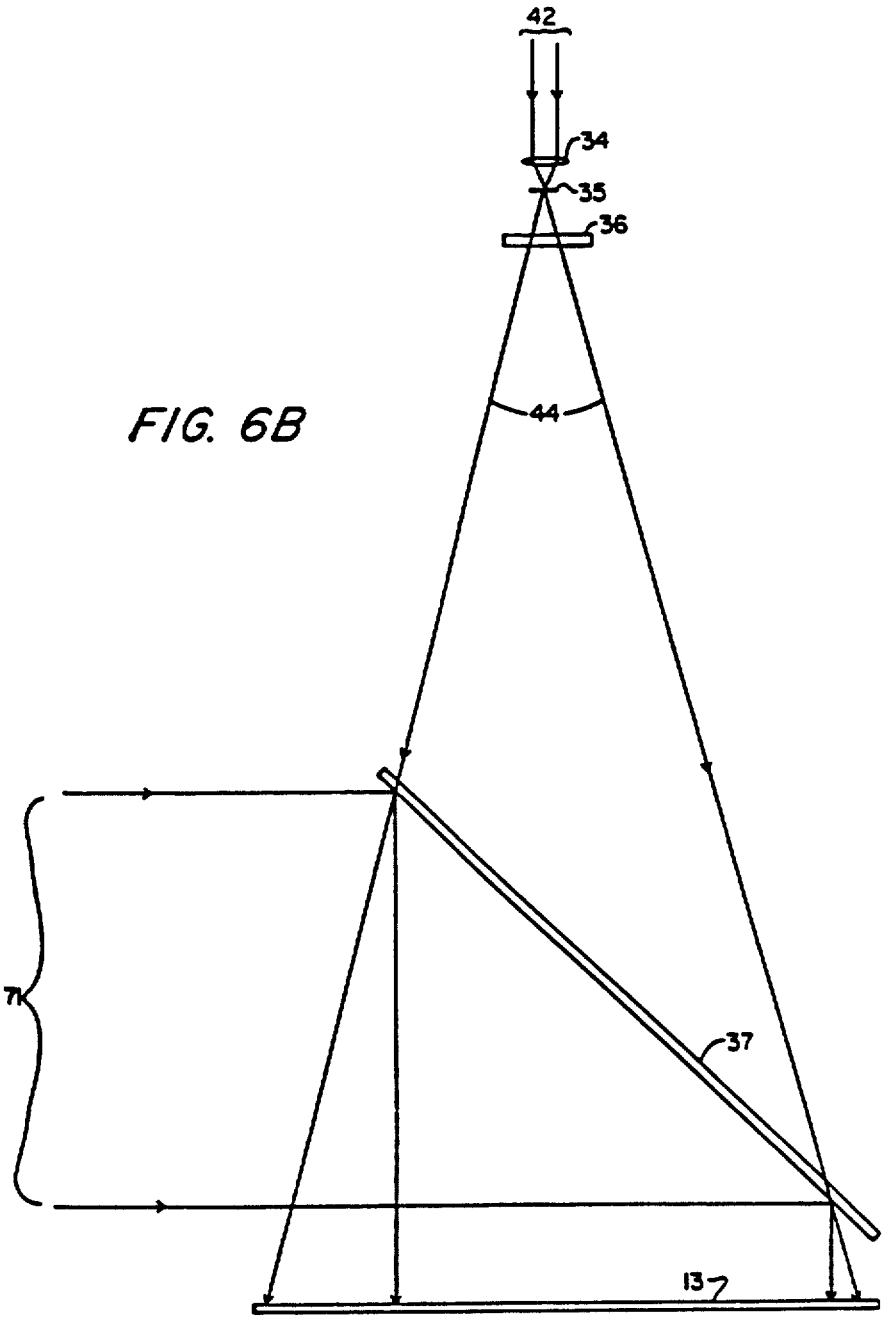

An improvement in efficiency is possible by recording the hologram 13, as shown in FIG. 6. By using two cylindrical lenses 32, the collection angle can be increased to approximately ninety (90) degrees of the desired collection annulus. Three [reference] beams 61, 40 and 41, which are in phase, illuminate the holographic surface 13 as shown. The generated interference fringes are not circular, as in FIG. 5, but are parallel to the intended scan line. In order to collect the diffuse component of the light reflected in the orthogonal direction, a second fringe set recorded at ninety (90) degrees to the first set is superimposed, as shown in FIG. 6B.

Referring to FIG. 6B, collimated reference beam 42 illuminates the hologram 13 through microscope objective lens 34, stop 35, cylindrical lens 36 and beam splitter 37 to create a [spherical] *cylindrical* wavefront as shown. The object beam angle 44 matches the maximum scan angle of the optical scanning system, for example thirty (30) degrees. A second plane wavefront reference beam 71 is reflected off beam splitter 37 creating [circular] interference fringes in hologram 13. In this case, the spatial frequency of the fringe sets follow a Fresnel distribution, and, at playback, the two sets of superimposed interference fringes behave as a crossed pair of cylindrical lenses at each position along the scan line.

Figure 2A:
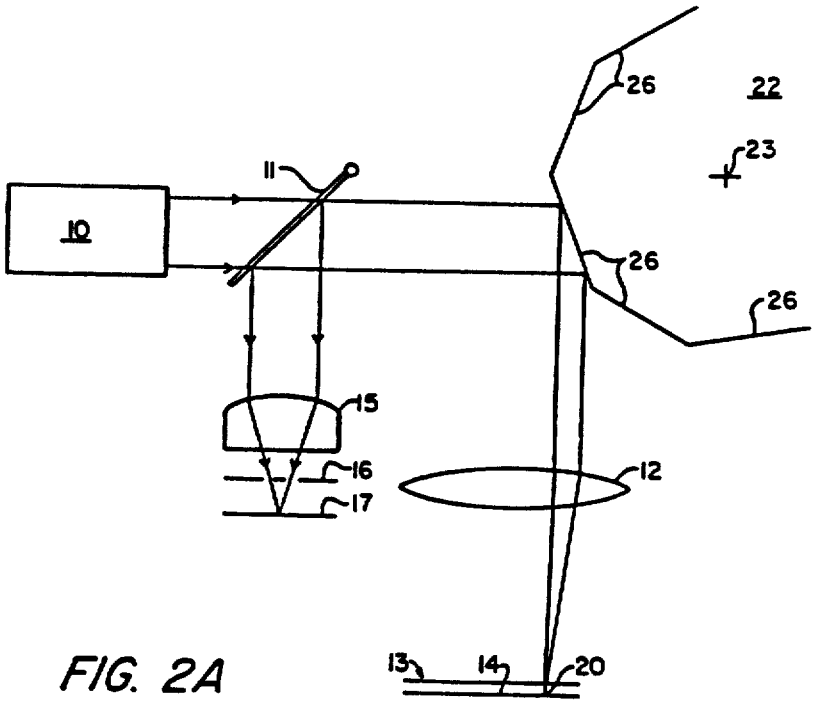
FIGS. 2A and 2B show in schematic side view an alternate embodiment of the subject invention as an optical reader using a polygonal scan mirror mechanism.
Figure 2B:
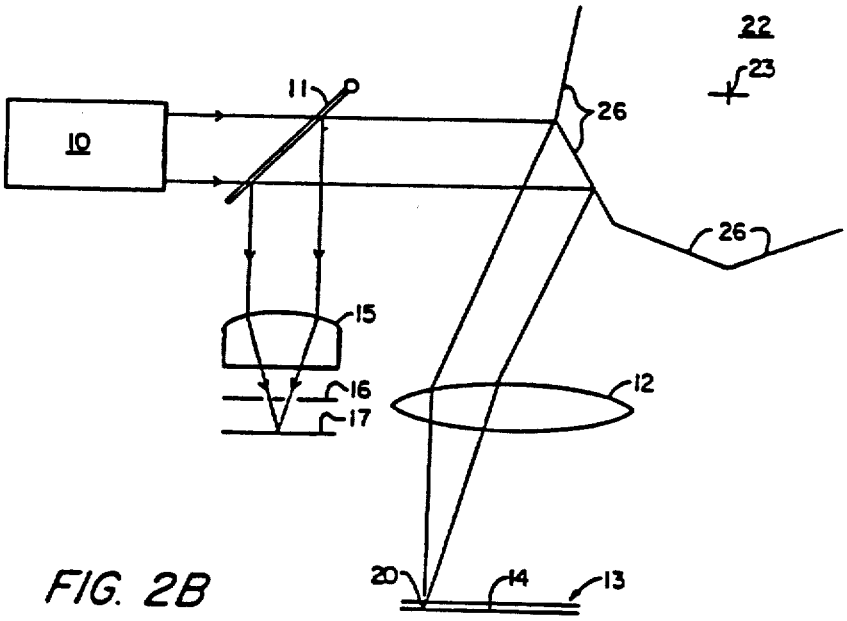
Figure 3:
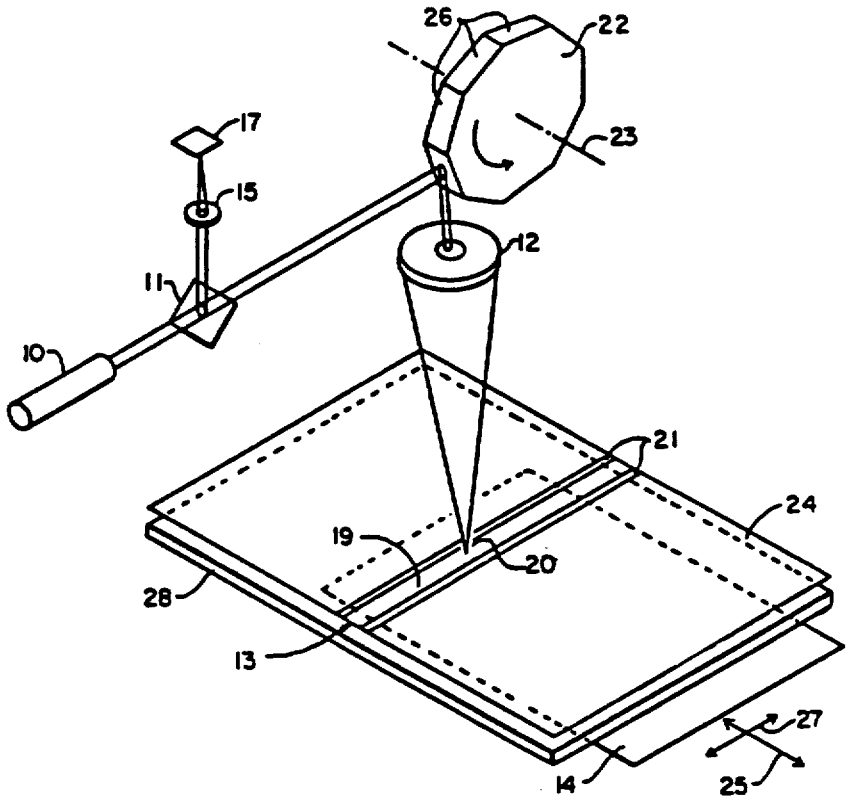
FIG. 3 shows an isometric view of the subject invention as an optical reader using a polygonal scan mirror mechanism.

In an alternate embodiment of an electro-optical reader, as shown in FIGS. 2A, 2B and 3, a traditional polygon line scan mechanism 22, having rotation axis 23, is inserted between the beam splitter 11 and the primary focussing assembly 12, such that the scan of document 14 is affected by the optical scan of point 20 across the document (as shown by the different positions of point 20 in FIGS. 2A and 2B) parallel to hologram 13 and axis 27 (see FIG. 3) in one direction, and the mechanical feed of the document in the other direction parallel to axis 25 (see FIG. 3). Light from source 10 is transmitted through optical beam splitter 11, and reflected by successive facets 26 of polygonal scan mirror 22 through focus assembly 12 and unmodulated portion 19 of hologram 13 to the surface of document 14. A sheet of some transparent substance, for example, glass, separates the hologram from the document 14 surface.

Figure 4:
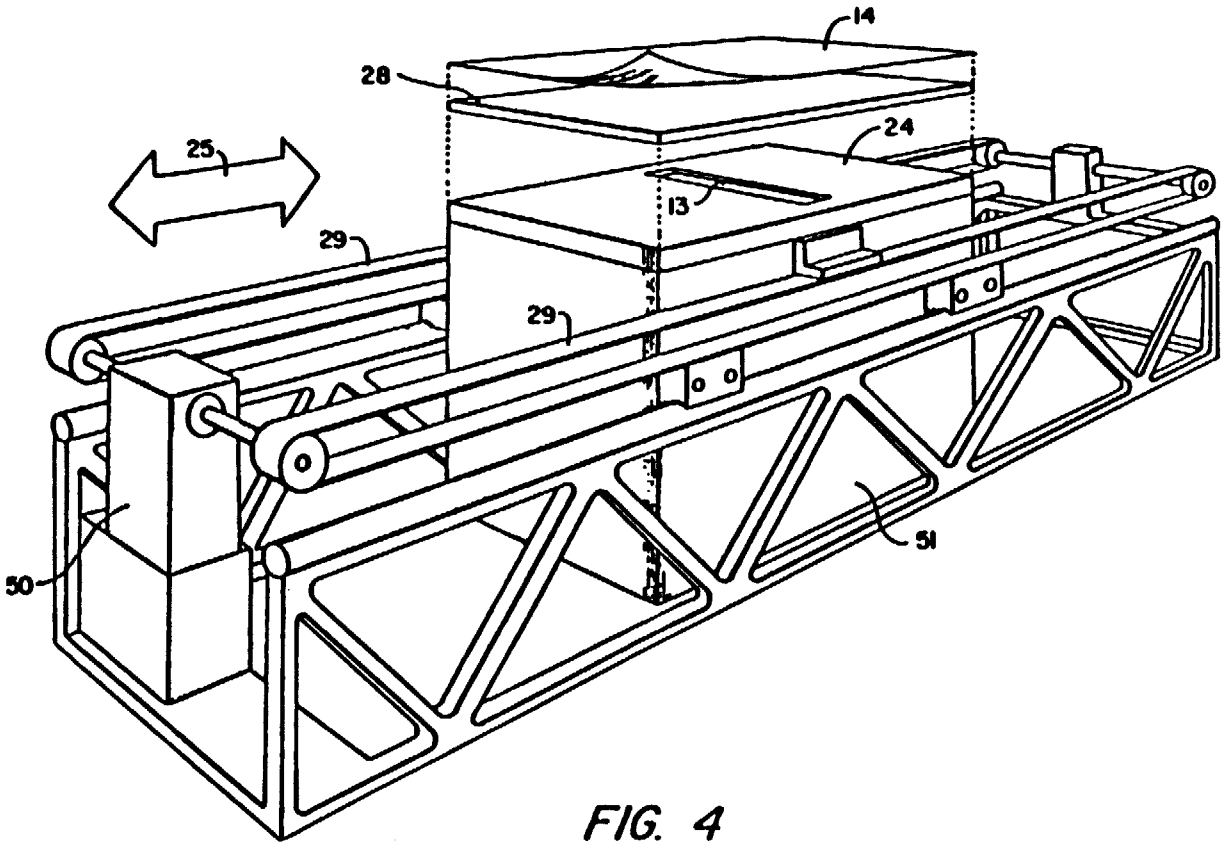
FIG. 4 shows an isometric view of an opto-mechanical scanning copier comprising the subject invention.

As shown in FIGS. 3 and 4, hologram 13 is suspended with respect to document surface 14 by a fixed framework 24, while document 14 is moved along axis 25 by some mechanical feed mechanism. FIG. 4 shows one embodiment of the described polygonal optical scanner with holographic reader apparatus using belts 29 and motor 50 driven mechanical feed assembly. Case 51 contains the optical scan mechanism comprising the scan mirror 22, beam splitter 11, detector focussing lens 15, detector 17 and source 10. Cover 24 holds hologram 13. Transparent plate 28 and document 14 are shown above the scan mechanism and may be held fixed by a case enclosing the entire mechanism.

Numerous objects and advantages of the present invention have been set forth in the foregoing description, together with details of the structure and the functions of the invention, and the novel features thereof are pointed out in the appended claims. The disclosure, however, is illustrative only, and changes may be made in detail, especially in matters of shape, size and arrangement of parts, within the principles of the invention, to the full extent indicated by the broad general meaning of the terms in which the appended claims are expressed.

Having described the invention, what is claimed as new and novel and for which it is desired to secure Letters Patent is:

1. Apparatus comprising:

A. a light source for providing a light beam;

B. an optical light beam splitter;

C. a first focusing lens for receiving said light beam through said beam splitter;

D. collection means placed between said first lens and a surface which includes information to be read in proximity with said surface, said collection means having an unmodulated portion through which said light beam is focused onto said surface and having a modulated portion through which diverging light from said surface is collected and directed to said beam splitter by means of said first focusing lens;

E. detector means; and

F. a second focusing lens for focusing said light received by said beam splitter from said surface for receipt by said detector means.

2. Apparatus as in claim 1 wherein said collection means is operable to separate signal representative of said information on said surface to be read from noise and directing said signal to said first focusing lens.

3. Apparatus as in claim 1 wherein said collection means is a hologram.

4. Apparatus as in claim 3 wherein said hologram is a phase hologram.

5. Apparatus as in claim 1 further comprising means for moving said surface with respect to said collection means so that all of said information on said surface may be read.

6. Apparatus as in claim 1 further comprising a scanning device coupled in the optical path between said beam splitter and said first focusing lens so that the operation of said scanning device causes said light beam to be focused on different portions of said surface without moving either said surface or said collection means.

7. Apparatus as in claim 6 wherein the operation of said scanning device causes said light beam to be focused along different portions of said surface on a first axis and further comprising means for moving said surface with respect to said collection means along a second axis thereby enabling all of said information on said surface to be read.

8. Apparatus as in claim 7 wherein said scanning device is a rotatable multifaceted mirror.

9. Apparatus as in claim 1 wherein said beam splitter is capable of being positioned in a first position or a second position, wherein said first position locates said beam splitter in the path between said light source and said first focusing lens thereby enabling said light beam to be transmitted to said source and received by said detector means from said surface so that said information may be read, and wherein said second position locates said beam splitter so that said detector means does not receive said light beam from said surface.

10. Apparatus as in claim 9 wherein said second position of said beam splitter enables said apparatus to write information on said surface and with other optical means, including said first and second focusing lens, enables the reading of said information on said surface.

11. Apparatus as in claim 10 further comprising a mirror coupled in the path between said first focusing lens and said surface so that said light beam is not received by said surface during a writing operation, but rather is received by another surface in a different location from said surface.

12. Apparatus as in claim 9 wherein said collection means is a phase hologram.

13. Apparatus as in claim 12 further comprising means for moving said surface with respect to said collection means so that all of said information on said surface may be read.

14. Apparatus as in claim 9 further comprising a rotatable multifaceted mirror coupled in the optical path between said beam splitter and said first focusing lens so that rotation of said mirror causes said light beam to be focused on different portions of said surface without moving either said surface or said collection means.

15. Apparatus as in claim 14 wherein rotation of said mirror causes said light beam to be focused along different portions of said surface on a first axis and further comprising means for moving said surface with respect to said collection means along a second axis thereby enabling all of said information on said surface to be read.

16. Apparatus as in claim 15 wherein said phase hologram is placed in a position substantially parallel to said surface.

*17. A reader apparatus for reading information on a surface by illuminating the surface and detecting the intensity of reflected light therefrom, such apparatus comprising*

*A. a light source for providing a light beam,*

*B. first focusing means for focusing the light beam onto a surface which bears information to be read,*

*C. collection means disposed between the first focusing means and the surface, and proximal to the surface, the collection means having a first portion through which the light beam is focused onto the surface and having a modulated second portion through which light reflected from the surface is collected and directed along an optical path,*

*D. detector means for developing a signal indicative of light intensity thereon, and*

*E. second focusing means for focusing onto the detector means the reflected light directed by the modulated portion.*

*18. Apparatus as in claim 17, wherein the modulated second portion includes a hologram.*

*19. Apparatus as in claim 18, wherein the hologram is disposed in a region of the collection means substantially surrounding the first portion.*

*20. Apparatus as in claim 19, wherein the hologram is a phase hologram.*

*21. Apparatus as in claim 19, further comprising means for moving the surface with respect to the collection means for enabling the reading of information in a region of the surface.*

*22. Apparatus as in claim 19, further comprising a scanning device in an optical path between the light source and the first focusing means for directing the light beam onto different portions of the surface.*

*23. Apparatus as in claim 22, wherein said scanning device directs the light beam on different portions of the surface located along a first axis, and further comprising means for moving the surface with respect to the collection means along a second axis, thereby enabling the reading of information at different locations on the scanned surface.*

*24. Apparatus as in claim 23, wherein the scanning device includes a rotatable multifaceted scanner.*

*25. Apparatus as in claim 24, wherein the hologram is disposed substantially parallel to the scanned surface.*

*26. An improved light gathering structure for use in an optical reader of the type wherein a light beam scans a path along a surface bearing information to be read, and the light reflected from the surface is directed to a detector for developing a signal representative of the information illuminated by the beam, such light gathering structure comprising*

*a strip hologram having a first portion through which the light beam scans the path and an adjacent modulated portion for collecting light diffusely reflected from the surface.*

*27. A structure as in claim 26, wherein the strip hologram includes a phase hologram.*

*28. A structure as in claim 27, wherein the modulated portion directs the collected light toward a fixed detector.*

*29. A structure as in claim 28, wherein the modulated portion has a focusing property.*

*30. A structure according to claim 29, wherein the strip hologram includes a first fringe pattern formed substantially parallel to the scan path.*

*31. A structure as in claim 30, wherein the strip hologram further includes a second fringe pattern formed substantially orthogonal to the fringes of said first pattern.*

*32. A light-gathering structure as in claim 26, wherein the first portion extends along the scan path and wherein the modulated portion is located adjacent thereto and comprises*

*a first hologram fringe pattern having fringes substantially parallel to the path for collecting light diffusely reflected from the surface, and*

*a second hologram fringe pattern having fringes substantially orthogonal to the fringes of the first pattern, so that the two sets of fringes behave as a crossed pair of cylindrical lenses at each position along the scan path.*

*33. A light-gathering structure as in claim 28, wherein the first portion extends along the scan path and wherein the modulated portion is located adjacent thereto and comprises*

*a first hologram fringe pattern having fringes substantially parallel to the path for collecting light diffusely reflected from the surface, and*

*a second hologram fringe pattern having fringes substantially orthogonal to the fringes of the first pattern.*

*34. A light-gathering structure as in claim 28, wherein the hologram includes a fringe pattern corresponding to interference fringes formed with illumination directed through a lens along a hologram recording axis, said recording axis and said scan path defining a recording beam plane, and wherein the angle between said recording axis and said scan path is a function of position along the scan path.*

*35. An improved method of reading optical reflectance information born on a surface by illuminating the surface along a scan path with a scanning beam and reading the reflectance information by directing the light reflected from the surface to a detector, the improvement comprising the steps of:*

*placing proximal to the surface a strip hologram including a first portion extending along the scan path, and also including an adjacent modulated second portion,*

*illuminating the surface by scanning it with the scanning beam through the first portion, and*

*directing through the modulated second portion, the light diffusely reflected from the surface toward the detector.*

*36. The method of claim 35, wherein the step of directing includes the step of directing, along an optical path substantially coaxial with the scanning beam, the light reflected from an illuminated spot on the surface.*

* * * * *